Patented Feb. 25, 1936

2,031,668

UNITED STATES PATENT OFFICE 2,031,668

ART OF PURIFYING YEAST

Gustave T. Reich, Drexel Hill, Pa.

No Drawing. Application April 4, 1929,
Serial No. 352,586

5 Claims. (Cl. 195—98)

This invention relates to a process of purifying yeast produced preferably by the fermentation of saccharine materials wherein either the yeast or the alcohol is the main product. When such materials have been fermented in refineries, breweries or distilleries or similar plants, the fermenter contains a sediment composed largely of yeast, which has been instrumental in producing the fermentation, and is healthy and vigorous, and also contains a certain amount of alcohol and certain impurities of the fermented material.

This yeast may be coagulated and flocculated and then separatingly settled by a suitable method such as gravitational sedimentation to separate out the portions containing the impure yeast or the impurities. The suspension I obtain is an aqueous suspension containing practically only yeast of bright color having a high protein value, which may be treated, de-hydrated and dried, as herein described.

My present process may be applied in the separating and settling steps in any process where a sediment containing yeast is treated by dilution, heating and selective separation, or a combination of any of these steps.

For my preferred procedure, I then take the yeast that may be removed from its fermenters by any suitable means such as described in my Patent No. 1,751,948 with its adulterant impurities, drawing off the clear liquid, and then washing out the sediment or drawing off the sediment and clear liquid simultaneously when the fermentation is completed, or the clear liquid may be removed gradually and the yeast removed, using a Dorr thickener, then washing it and diluting to a concentration of approximately 1:2.

I may then settle out part of its impurities and dilute it to 1:4, and then heat it to a temperature somewhat above 35° C. This temperature depends upon the concentration of the yeast. This will coagulate the yeast, but will not precipitate it to a material extent, and will cause a layer, chiefly of impurities, to fall to the bottom of the settling tank; this layer is darker and thick and may contain part of the gums, cellulose, sand and most of the insoluble mineral salts, and perhaps some yeast of low protein value.

This lower portion is only a small proportion of the suspension. It may be increased or decreased in amount to suit the various conditions influencing the purity of the yeast, and it can be dehydrated and dried, and sold for animal feed or fertilizer.

The portion above this layer may then be separated from the lower layer by suitable means (though the next step may be carried out without such separation), for instance, by overflowing and, if desired, greatly more diluted, so that the dilution is from 1:6 upward to 1:10 or more, depending upon various factors such as material, etc., the various relations between the temperature at which the suspension is heated, the extent of time of the heating and the extent of the dilution all have their effect on the suspension treated. These relations may be determined by laboratory testings for any particular yeast sediment, and may be charted and the chart used in the commercial operation of my process.

This portion may be raised to a temperature that is much higher, whereupon a thin dark layer will separate out at the top of the liquid. This is nearly all composed of a yeast of high protein content but dark in color, and hence not as desirable for sale for food purposes.

This separation of the upper layer takes place most advantageously at high dilution, heating or both, and each being a factor in the speed and completeness of its formation, while a lower dilution and temperature favors the precipitation of the lowermost layer containing the impurities, which portion may be sold for animal feed or fertilizer. As a series of examples, suppose the dilution should be 1:1. 1,000 c. c. of the suspension at the temperature of 15°, 35°, 50°, 75°, and 100° C. would usually show a very small settlement after 1 hour, the rate decreasing gradually and becoming nearly constant at the 6th hour, and about 150 c. c., 175 c. c., 200 c. c., 245 c. c., and 250 c. c.; where the dilution is 1:2, the settlement in the first two hours proceeds much more rapidly and where the dilution is 1:4 usually the settling takes place very promptly frequently more than half the suspension is cleared in the first hour, after which the clearing of the suspension progresses very slowly. As an example, such a suspension containing 1000 c. c. may, at 100° C. in the first fifteen minutes have cleared its upper 650 c. c. in a half hour. By separating out the dark upper layer, the middle portion of the aqueous mixture, with only the living yeast of high protein value and light bright color suspended therein is left for further treatment. While I have described a particular mode of separating the yeast, I do not confine the application of the below described method of treatment to a yeast suspension obtained as above described, because the process below is applicable to a suspension of yeast obtained by other methods, such as, for instance, in the production of beer.

The treatment above described of selective separation of the yeast is, of course, not to be confined to cases where three layers only appear; under many circumstances these layers may be more numerous, and sometimes the limits of separation of layers may not be sharply defined; it is convenient and substantially correct to consider them as three. The cutting can be into more than three portions.

Supposing, however, a suspension of clear yeast of high grade, practically freed from impurities has been obtained, this suspension may be centrifuged and dried merely, but I prefer to treat the yeast in it with chemicals that have no detrimental influence on living beings, and have no fat solvent property nor destructive action on the yeast cell, but are used merely for the improvement of color. I have found this advantageous in getting a good light colored product.

A suitable chemical for this purpose, is acetic or phosphoric acid, hydrogen peroxide or weak alkali, also various inorganic salts such as bicarbonate of soda, sodium bisulphite. It is very important to choose the chemicals very carefully, as quite often a dark color in the yeast is caused by the presence of inorganic salts, for instance, iron salts. In such cases, an alkali would precipitate them, and so would increase and not decrease any darkness in color of the yeast, either when treated or exposed to the air or light. But a too dark color often arises from coloring matter, for instance, in the molasses itself, and sometimes comes from methods of fermentations. The treatment may be repeated, if desired.

Yeast may be washed a second time with clear water or water containing chemicals such as are described above, or selectively separated again, depending upon the marketability of the product, and when so separated and washed, de-hydrated by any suitable means such as a centrifugal or filter press, and the wash water may be returned to a prior stage of the process.

The de-hydrated yeast which may have been centrifuged is dried. The drying may be done in any suitable dryer.

The dark yeast from the upper layer may be similarly treated, viz. centrifuged or dried, by any suitable method.

Where the liquid holding in suspension the yeast that would form both the middle and upper layers is not allowed to settle until these layers separate, the process of treating this liquid can follow the treatment of the middle layer, but usually the product is less desirable, and for this reason the process can be simplified when both layers are mingled together, and a less fine product obtained, but one more cheaply produced.

Yeast from the middle layer, refined as above, is almost tasteless, has very light color and does not require any filler whatever, such as cellulose, starch or ground cereal; while hitherto all pure dried yeast was either dark in color or required fillers, the yeast obtained hereby is light. In this process also, high temperatures are avoided and the yeast cells therefore are not ruptured, and, when molasses is used in the fermentation, much of the calcium salt does not go into solution, as this salt is more soluble in cold than in hot water, and this salt is collected in the lower layer.

Many variations may be made in the general method set forth above. Sometimes it is preferable to get one portion of the suspension containing a particular level removed first, and then afterwards separate the other portions. This often makes the separation and dehydration easier.

The main purpose of using the wash water that had been used in a later stage of the process in an earlier stage, or returning it to the fermenter or molasses mixer is chiefly the saving of alcohol. Any yeast contained in the wash water is also returned.

It will be obvious from the foregoing that many changes may be made without departing from the spirit of my invention.

I claim:—

1. In the art of purifying yeast wherein is contained light colored and dark colored living yeast cells, the steps of forming a suspension of the yeast in water in which the proportion of water is between one part yeast and four parts water and one part of yeast and ten parts of water, then heating the suspension to substantially above 35° C., until there forms at the top of the suspension a layer of dark colored yeast, removing this layer and then decolorizing the yeast in the remaining suspension by adding a member of the group composed of acetic acid, phosphoric acid and hydrogen peroxide, and causing the solution to stand until the yeast in said remaining suspension is decolorized.

2. In the art of improving and lightening the color of yeast in a suspension of yeast discolorable by the presence of inorganic salts, the steps of coagulating, flocculating in an aqueous suspension, from which the insoluble impurities have been eliminated, and subsequently adding to the suspension, a chemical of the group composed of acetic and phosphoric acid and hydrogen peroxide, that will not combine with such said inorganic salts that are contained in the suspension.

3. In the art of improving the quality of yeast, in a suspension freed from insoluble impurities, said yeast being coagulated and flocculated, the step of adding to the suspension a chemical of the group composed of acetic and phosphoric acid and hydrogen peroxide.

4. In the art of improving the quality of yeast, in an aqueous suspension freed from impurities, said yeast having been coagulated and flocculated, the steps of adding to the suspension a chemical of the group composed of acetic and phosphoric acid and hydrogen peroxide, and heating the suspension to a temperature sufficient to precipitate and cause to settle any calcium salt dissolved in the liquid of the suspension.

5. In the art of improving yeast, the step of mixing in suspension the coagulated yeast, with a decolorizing chemical of the group composed of acetic acid, phosphoric acid and hydrogen peroxide.

GUSTAVE T. REICH.